United States Patent [19]

Schmidt-Bruecken et al.

[11] 3,915,369

[45] Oct. 28, 1975

[54] METHOD OF DRY-SOLDERING HIGHLY REFRACTORY MATERIALS

[75] Inventors: Heinrich Schmidt-Bruecken, Darmstadt; Winfried Schlapp, Weiterstadt, both of Germany

[73] Assignee: Siemens Aktiengesellschaft, Berlin & Munich, Germany

[22] Filed: Mar. 13, 1973

[21] Appl. No.: 340,831

[30] Foreign Application Priority Data

Mar. 17, 1972 Germany ........................... 2213115

[52] U.S. Cl. ................. 228/194; 228/903; 228/198

[51] Int. Cl.$^2$ ........................................ B23K 31/02

[58] Field of Search ......................... 29/473.1, 472.9

[56] References Cited

UNITED STATES PATENTS

| | | | |
|---|---|---|---|
| 2,015,482 | 9/1935 | Lilienfeld | 29/472.9 X |
| 2,385,380 | 9/1945 | Ratchford et al. | 29/472.9 X |
| 2,564,738 | 8/1951 | Zurich | 29/472.9 UX |
| 3,180,023 | 4/1965 | Titus | 29/473.1 X |
| 3,372,732 | 3/1968 | Cocks et al. | 29/472.9 X |
| 3,377,696 | 4/1968 | Darrow | 29/472.9 |
| 3,444,613 | 5/1969 | Foerster | 29/473.1 |
| 3,517,432 | 6/1970 | Landstrom | 29/472.9 X |
| 3,531,853 | 10/1970 | Klomp | 29/472.9 |
| 3,795,041 | 3/1974 | Hennicke et al. | 29/472.9 |
| 3,826,630 | 7/1974 | Roy | 29/473.1 X |

FOREIGN PATENTS OR APPLICATIONS

| | | | |
|---|---|---|---|
| 1,355,568 | 12/1962 | France | 29/472.9 |
| 776,970 | 6/1957 | United Kingdom | 29/472.9 |
| 1,047,421 | 11/1966 | United Kingdom | 29/472.9 |

*Primary Examiner*—Ronald J. Shore
*Attorney, Agent, or Firm*—Hill, Gross, Simpson, Van Santen, Steadman, Chiara & Simpson

[57] ABSTRACT

Highly refractory binary ceramic materials such as carbides, borides, nitrides and silicides are joined to another material by forcing a solder material which includes therein at most 1 at. % of an active metal such as Al, Ba, Ce, Cr, Hf, Mo, Nb, Ni, Ta, Ti, Zr, etc. into intimate contact with the ceramic and then heating the so-formed couple to a temperature sufficiently high for a solid-state chemical reaction to occur between the active metal and the more negative element in the binary ceramic and below the melting point of the solder material whereby interconnecting bridge-like bonds are formed between the solder material and the ceramic.

10 Claims, No Drawings

METHOD OF DRY-SOLDERING HIGHLY REFRACTORY MATERIALS

BACKGROUND OF THE INVENTION

1. Field of the Invention

The invention relates to dry-soldering of refractory materials and more particularly to a method of joining carbides, nitrides, borides and silicides with another material, such as a metal.

2. Prior Art

German Offenlegungsschrift P 20 55 657.4 suggests a method of joining select metal surfaces with select ceramic oxide surfaces by a dry-soldering technique. Generally, this method comprises placing a thin sheet of a metal between the portions to be joined, which may both be of ceramic oxide or one of ceramic oxide and the other of metal. This mechanical couple is forced into intimate contact, as by a vise-means and then heated while still in intimate contact to an elevated temperature, such as 800° to 1000°C., which does not exceed the melting point of the metal forming the thin sheet. This metal sheet may be composed of almost pure Ag, Au, or Cu alloyed with a small amount of a select metal having a high affinity for oxygen, such as Be, Li, Mg, Ti or Zr. The high oxygen affinity metal portions which are within the thin sheet then chemically react at the elevated temperatures with the adjacent oxide surfaces due to their affinity for oxygen in the ceramic oxide. Presumably, the high oxygen affinity metal reacts by reducing the ceramic oxide so that connecting bridgelike bonds form between the metal and the ceramic and cause adhesion between the adjacent surfaces. Side reactions, such as scaling or the like, are eliminated by heating the portions being joined in a high vacuum or an inert atmosphere.

Generally, it is immaterial for the formation of the solder connection whether the oxides forming a ceramic body are in a crystalline or in a sintered form. The bonding mechanism does not appear affected whether the oxides forming a body were created by melting such oxides or created by transforming them from a glass phase. In accordance with the dry-soldering technique, a bonding may be achieved with glasses and also with glass ceramics since in either case, a non-metallic insulator composed of oxides is bonded to an oxygen-affinity metal so that a reduction reaction takes place and connecting bridge-like bonds or the like are formed.

In modern technology, ceramics, glasses, etc. are not limited to oxide materials but also include other highly refractory binary compounds consisting of carbides, nitrides, borides and/or silicides. Such binary compounds are convertible into ceramic form, such as by sintering or melting or may exist naturally in a glass-like or a monocrystalline form. Diamonds are also quite important in modern technology and are included as a carbide, i.e. a carbocarbide generally available as a monocrystalline. Presently, techniques for bonding such high refractory binary compounds to other materials, particularly by dry-soldering, does not exist.

SUMMARY OF THE INVENTION

The invention provides a method of joining highly refractory surfaces composed of binary compounds selected from the group consisting of carbides, borides, nitrides and silicides with another material, such as a metal, by dry-soldering techniques.

It is a novel feature of the invention to force an active metal having a formation enthalpy that is at least 50% of the formation enthalpy of the binary metallic compound, into intimate contact with the binary compound and heating the so-formed arrangement to a temperature sufficiently high for a solid-state chemical reaction to occur between the active metal and the more negative elements of the binary compound and below the melting point of the active metal so that bridge-like bonds form between the active metal and the binary compound.

The active metal is readily selected from metals having the requisite formation enthalpy as determined from appropriate reference sources, such as tables for high temperature materials, for example, see D'Ans und Lax, Taschenbuch fuer Chemiker und Physiker (Springer-Verlag, Berlin, Goettingen, Heidelberg), 1949 —(Pocketbook or Handbook for Chemists and Physicists) and include such metals as Al, Ba, Ce, Cr, Hf, Mo, Nb, Ni, Ta, Ti, Zr, etc. The active metal may be utilized as such or may be alloyed with a basic metal such as Cu, Ag, Au and utilized in a foil form, may be a portion of a vapor-deposited layer adjacent the surfaces being joined; or be a portion of a thermally decomposable chemical composition on or in the surfaces to be joined which yields the active metal and an inert residue under ambient dry-soldering conditions.

DESCRIPTION OF THE PREFERRED EMBODIMENTS

The invention provides a method of joining highly refractory surfaces composed of binary compounds, such as carbides (including diamonds), borides, nitrides and silicides by dry-soldering techniques wherein a soldering material which includes an active metal capable of forming connecting bridge-like bonds with the binary compound is brought into intimate contact with the surface composed of such a compound and heated sufficiently for a solid-state chemical reaction to take place between the active metal and the more negative element in the binary compound.

The invention is useful for joining ceramic surfaces or bodies composed of a binary compound selected from the group consisting of carbides (including diamonds), borides, nitrides and silicides, all which contain such binary compounds in an amount sufficient for a chemical reaction to occur with an active metal.

For the sake of simplicity, the principles of the invention will be primarily described in reference to ceramic carbides, which include diamonds, and it will be understood that these principles also apply to other highly refractory ceramic materials, such as borides, nitrides and/or silicides.

In order to apply the dry-soldering technique to ceramic carbide bodies or surfaces, an active metal must be selected which has a high affinity for carbon so that it can chemically act on the carbide or diamond and form connecting bridge-like bonds with the carbon atoms thereof. Similar to the dry-soldering of ceramic oxides, it is necessary for the formation of adhesive valences that the carbide or diamond be brought into intimate contact, as by mechanical pressure, with a select soldering material which includes an active metal therein having a high affinity for carbon (i.e. the more negative element of a metal-carbon compound), for example, in a sheet or foil form and that this couple or mechanical arrangement of materials be heated to a temperature sufficiently high for the active metal to react with the carbon and below the melting point of the soldering material so that connecting bridge-like bonds are formed between the active metal and the carbides. Through extensive experimentation, it has been determined that metal suitable for the formation of adhesive valences to, for example, diamonds have the formation enthalpy of at least about 10 Cal. per atom gram of carbon. Exemplary active metals suitable for dry-soldering of diamonds include Cr, Hf, Nb, Ti, Zr, etc.

The temperature required for dry-soldering of carbide surfaces with an active metal so as to achieve a solid-state carbide reaction in a fairly short time period is preferably at least about 800° C. or slightly higher. Diamonds will withstand temperatures of 1000° C. without transformation into a more stable graphite form. Accordingly, the heating temperature is preferably in the range of about 800° to 1000° C.

If aluminum is selected as the active metal, it must be remembered that it melts at 660° C. and in order to take advantage of the quick reaction thereof with carbides at higher temperatures, it is necessary that the aluminum be alloyed with a basic metallic component so that the melting point of the alloy is higher than the soldering temperature. For example, an alloy of copper and aluminum having only 18 atom % or 8.5 wt. % of aluminum therein has a melting point of about 1037° C. However, such high proportions of active metal as noted above for a Cu/Al alloy are not required for dry-soldering diamonds and/or carbides. Active metal portions in the order of magnitude of at most 1 atom % and alloys containing only 1 atom ‰ (per thousand) are satisfactory for the practice of the invention. This allows the dry-soldering process to be effected with a solder material consisting of almost pure basic metal, i.e. Ag, Au, Cu, etc. and the advantages of good ductility and high electrical conductivity are available where desired.

The formation of adhesive valences to carbides is, of course, always achieved if the active metal has a larger formation enthalpy to carbon than to the metal of the ceramic carbide. However, active metals having a formation enthalpy smaller than that of the ceramic carbides are also useful, since the fully saturated valences in the interior of the ceramic body or surface do not have to be broken or disturbed and bond-like connections are only required with the unsaturated valences at the surface being joined or soldered, such as with carbon atoms apparently lacking a molecular partner. Accordingly, the elements useful as active metals are characterized by a formation enthalpy to, for example, carbon, which is at least 50% of the formation enthalpy of the ceramic carbide. From the foregoing, it will be seen that selection of an element as an active metal is readily accomplished by consultation to handbooks or similar reference sources which list formation enthalpy of, for example, various high temperature materials, i.e. see D'Ans und Lux, infra, etc. Such reference sources indicate that the elements enumerated earlier are useful as active metals for dry-soldering of diamonds and experimental data confirmed that these elements are useful for dry-soldering boron carbide ceramics.

Of course, other modern ceramic materials such as borides, nitrides or silicides are dry-soldered in an analogous manner. Ceramic boride surfaces are dry-soldered by forcing a dry-solder material which includes an active metal having a high formation enthalpy to boron, for example, zirconium, into intimate contact with the boride surface and subjecting such an arrangement to heat at a temperature sufficiently high for a solid-state chemical reaction between zirconium and boron to take place and below the melting point of the solder material. Nitride ceramics are dry-soldered by selecting an active metal having a high nitration enthalpy, such as Ba, Hf or Zr and proceeding as outlined above. Silicide ceramics are dry-soldered by selecting an active metal having a high formation enthalpy to silicon, for example, cerium, molybdenum, niobium, nickel, tantalum or zirconium and proceeding in a similar fashion.

With borides, silicides and nitrides, it is preferable to form bonding bridge-like valence couples between the ceramic and the active metal only with the boron, nitrogen or silicon atoms located at the surface of the crystalline ceramic, i.e. with the unsaturated valence atoms of the crystal. Accordingly, the elements useful as active metals are characterized by a formation enthalpy which is at least 50% of the formation enthalpy of the ceramic compound, and thus may be smaller than the formation enthalpy of the particular ceramic compound.

The principles of the invention allow workers in the art to dry-solder carbides (including diamonds), borides, nitrides and/or silicides, which may be in polycrystalline or monocrystalline form or in a mixed form with another material. The invention is not limited to embodiments where the active metal is distributed within a main component of a solder, as in an alloy. The active metal may also be reacted with carbides, borides, nitrides or silicides when it is in the form of foils, vapor deposited layers, thermally decomposable chemical compounds which are on or in the surface of a ceramic or a diamond and upon heating yield the active metal and an inert residue. Thus, an active metal may be used as such or may be incorporated in a solder material that allows the active metal to react with the ceramic upon heating.

In summation, the invention provides a method of joining highly refractory ceramics composed of binary compounds selected from the group consisting of carbides (including diamonds), borides, nitrides and silicides with another material by the dry-solder technique. The solder material which includes an active metal capable of forming connecting bridge-like bonds with a select ceramic is forced into intimate contact with such ceramic and the so-formed arrangement is heated sufficiently for a solid-state chemical reaction to occur between the active metal and a more negative element in the binary compound but below the melting point of the solder material so that connecting bridge-like bonds form between the active metal and the ceramic. Preferably, the active metal is characterized by a formation enthalpy that is at least 50% of the formation enthalpy of the binary compound. The heating temperature is, at least in certain embodiments, preferably in the range of about 800° to 1000° C. and the heating step may, of course, be conducted in a vacuum or in an inert atmosphere if desired.

As is apparent from the foregoing specification, the present invention is susceptible of being embodied with various alternations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as is set forth and defined in the hereto-appendant claims.

What we claim as our invention:

1. A method of dry-soldering a highly refractory ceramic surface composed of a binary compound other than an oxide selected from the group consisting of carbides, borides, nitrides and silicides with a surface composed of a metal, comprising the steps of:

forming a dry-solder material from a basic metal and at most 1 atomic percent of an active metal which is characterized by a formation enthalpy which is at least 50% of the formation enthalpy of said binary compound;

forcing said dry-solder material into intimate contact with the surfaces being dry-soldered; and heating the so-formed arrangement to a temperature sufficiently high for a solid-state chemical reaction to occur between said active metal and said binary compound and below the melting point of said dry-solder material.

2. A method as defined in claim 1 wherein said active metal is included within said dry-solder material in a form selected from the group consisting of an alloy with said basic metal, a foil on a select surface of said basic metal, a vapor-deposited layer on a select surface of said basic metal and an ion within a thermally decomposable chemical compound yielding said active metal and an inert residue, said compound forming a coating on a select surface of said basic metal.

3. A method as defined in claim 1 wherein the amount of said active metal within said dry-solder material is 1 atom of active metal per 1000 atoms of said basic metal.

4. A method as defined in claim 1 wherein said basic metal is selected from the group consisting of Ag, Au and Cu.

5. A method as defined in claim 1 wherein said ceramic surface is composed of a diamond and said active metal is characterized by a formation enthalpy to carbon of at least 10 Cal. per atomic gram of carbon.

6. A method as defined in claim 5 wherein said active metal is selected from the group consisting of Cr, Hf, Nb, Ti and Zr.

7. A method of dry-soldering a highly refractory ceramic surface composed of a binary carbide compound other than an oxide with a surface composed of a metal, comprising the steps of:

forming a dry-solder material from a basic metal and at most 1 atomic percent of an active metal which is characterized by a formation enthalpy which is at least 50% of the formation enthalpy of said binary carbide compound;

forcing said dry-solder material into intimate contact with the surfaces being dry-soldered; and heating the so-formed arrangement to a temperature sufficiently high for a solid-state reaction to occur between said active metal and said binary carbide compound and below the melting point of said dry-solder material.

8. A method of dry-soldering a highly refractory ceramic surface composed of a binary boride compound other than an oxide with a surface compound of a metal, comprising the steps of:

forming a dry-solder material from a basic metal and at most 1 atomic percent of an active metal which is characterized by a formation enthalpy which is at least 50% of the formation enthalpy of said binary boride compound;

forcing said dry-solder material into intimate contact with the surfaces being dry-soldered; and heating the so-formed arrangement to a temperature sufficiently high for a solid-state reaction to occur between said active metal and said binary boride compound and below the melting point of said dry-solder material.

9. A method of dry-soldering a highly refractory ceramic surface composed of a binary nitride compound other than an oxide with a surface composed of a metal, comprising the steps of:

forming a dry-solder material from a basic metal and at most 1 atomic percent of an active metal which is characterized by a formation enthalpy which is at least 50% of the formation enthalpy of said binary nitride compound;

forcing said dry-solder material into intimate contact with the surfaces being dry-soldered; and heating the so-formed arrangement to a temperature sufficiently high for a solid-state reaction to occur between said active metal and said binary nitride compound and below the melting point of said dry-solder material.

10. A method of dry-soldering a highly refractory ceramic surface composed of a binary silicide compound other than an oxide with a surface composed of a metal, comprising the steps of:

forming a dry-solder material from a basic metal and at most 1 atomic percent of an active metal which is characterized by a formation enthalpy which is at least 50% of the formation enthalpy of said binary silicide compound;

forcing said dry-solder material into intimate contact with the surfaces being dry-soldered; and heating the so-formed arrangement to a temperature sufficiently high for a solid-state reaction to occur between said active metal and said binary silicide compound and below the melting point of said dry-solder material.

* * * * *